US012626380B2

(12) United States Patent
Yosub et al.

(10) Patent No.: US 12,626,380 B2
(45) Date of Patent: May 12, 2026

(54) PATTERN-BASED DEPTH MAPPING WITH EXTENDED REFERENCE IMAGE

(71) Applicant: Apple Inc., Cupertino, CA (US)

(72) Inventors: Shay Yosub, Kfar Yehezkel (IL); Noam Badt, Tel Aviv (IL); Boris Morgenstein, Tel Aviv (IL); Yuval Vardi, Tel Aviv (IL); David Pawlowski, Tel Aviv (IL); Assaf Avraham, Givatayim (IL); Pieter Spinnewyn, Los Gatos, CA (US); Tom Levy, Holon (IL); Yohai Zmora, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 589 days.

(21) Appl. No.: 17/944,207

(22) Filed: Sep. 14, 2022

(65) Prior Publication Data

US 2024/0087149 A1     Mar. 14, 2024

(51) Int. Cl.
| | |
|---|---|
| *G06T 7/521* | (2017.01) |
| *G06T 5/50* | (2006.01) |
| *G06V 10/141* | (2022.01) |
| *G06V 10/24* | (2022.01) |
| *G06V 10/74* | (2022.01) |

(52) U.S. Cl.
CPC ............... *G06T 7/521* (2017.01); *G06T 5/50* (2013.01); *G06V 10/141* (2022.01); *G06V 10/245* (2022.01); *G06V 10/761* (2022.01); *G06T 2207/10028* (2013.01); *G06T 2207/20221* (2013.01)

(58) Field of Classification Search
CPC ..................................................... G06T 7/521
See application file for complete search history.

(56) References Cited

U.S. PATENT DOCUMENTS

| | | | |
|---|---|---|---|
| 8,493,496 B2 * | 7/2013 | Freedman | .............. G06T 7/521 |
| | | | 345/32 |
| 8,749,796 B2 | 6/2014 | Pesach et al. | |
| 9,400,177 B2 | 7/2016 | Pesach | |

(Continued)

OTHER PUBLICATIONS

Macworld, "Face ID on the iPhone X: Everything you need to know about Apple's face recognition", pp. 1-10, Dec. 24, 2017 downloaded from https://www.macworld.com/article/230490/face-id-iphone-x-faq.html#/primary.

*Primary Examiner* — Benjamin O Dulaney
(74) *Attorney, Agent, or Firm* — Meitar Patents LTD.; Daniel Kligler

(57) ABSTRACT

A method for depth mapping includes providing a depth mapping device comprising a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis. The projector projects the pattern onto first and second planes at first and second distances from the camera, and the camera captures first and second reference images containing first and second parts of the pattern on the first and second planes, respectively. The first and second reference images are combined to produce an extended reference image including both the first and second parts of the pattern.

18 Claims, 4 Drawing Sheets

(56) References Cited

U.S. PATENT DOCUMENTS

| | | | |
|---|---|---|---|
| 10,957,059 B1 * | 3/2021 | Katz | G06T 7/521 |
| 11,381,729 B1 * | 7/2022 | Poloniewicz | G06K 7/10722 |
| 11,523,055 B1 * | 12/2022 | Chaudhri | G06T 3/4053 |
| 11,856,180 B1 | 12/2023 | Morgenstein et al. | |
| 2008/0165341 A1 | 7/2008 | Dillon et al. | |
| 2010/0007717 A1 | 1/2010 | Spektor et al. | |
| 2012/0050488 A1 * | 3/2012 | Cohen | H04N 17/002 |
| | | | 348/46 |
| 2015/0124055 A1 | 5/2015 | Kotake et al. | |
| 2015/0206325 A1 * | 7/2015 | Furihata | G06T 7/586 |
| | | | 382/154 |
| 2017/0097417 A1 * | 4/2017 | Wang | H03K 3/0372 |
| 2017/0272651 A1 * | 9/2017 | Mathy | H04N 5/2226 |
| 2018/0033146 A1 * | 2/2018 | Bleyer | G01B 11/2513 |
| 2019/0231220 A1 * | 8/2019 | Refai | A61B 1/000094 |
| 2019/0304121 A1 * | 10/2019 | Wang | G06T 7/85 |
| 2019/0339369 A1 * | 11/2019 | Fenton | G06T 7/001 |
| 2020/0033113 A1 * | 1/2020 | Slettemoen | G01B 9/02019 |
| 2020/0068102 A1 * | 2/2020 | Tilleman | H04N 23/56 |
| 2021/0192243 A1 * | 6/2021 | Lin | G06V 40/40 |
| 2022/0364849 A1 | 11/2022 | Yosub et al. | |
| 2023/0068727 A1 * | 3/2023 | Saphier | G06T 17/20 |
| 2023/0085063 A1 * | 3/2023 | Ginzburg | G01B 11/22 |
| | | | 356/4.01 |

* cited by examiner

CAPTURE REFERENCE IMAGES
AT MULTIPLE DISTANCE ~70

FIND DISPARITIES BETWEEN OVERLAPPING
PARTS OF PATTERNS ~72

EXTRAPOLATE DISPARITIES
TO NON-OVERLAPPING PARTS ~74

WARP REFERENCE IMAGES TO CORRECT
EXTRAPOLATED DISPARITIES ~76

STITCH TOGETHER WARPED IMAGES TO
CREATE EXTENDED REFERENCE ~78

PATTERN-BASED DEPTH MAPPING WITH EXTENDED REFERENCE IMAGE

FIELD OF THE INVENTION

The present invention relates generally to methods and systems for three-dimensional (3D) mapping, and specifically to pattern-based depth mapping.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods are based on projecting a pattern of structured light onto an object or scene that is to be mapped, for example a pattern of spots. A camera captures an image of the projected pattern. A processor finds local disparities between the pattern in the captured image and a reference pattern captured at a known distance from the camera. Based on the local disparities, the processor computes a depth map of the object or scene.

The terms "light" and "optical radiation" are used interchangeably in the present description and in the claims to refer to electromagnetic radiation in any of the visible, infrared, and ultraviolet ranges of the spectrum.

SUMMARY

Embodiments of the present invention that are described hereinbelow provide improved methods and systems for pattern-based depth mapping.

There is therefore provided, in accordance with an embodiment of the invention, a method for depth mapping, which includes providing a depth mapping device including a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis. The projector is operated to project the pattern onto a first plane at a first distance from the camera, and using the camera, a first reference image is captured containing a first part of the pattern on the first plane. The projector is operated to project the pattern onto a second plane at a second distance from the camera, different from the first distance, and using the camera, a second reference image is captured containing a second part of the pattern on the second plane. The first and second reference images are combined to produce an extended reference image including both the first and second parts of the pattern. The extended reference image is applied in processing a further image captured by the camera of an object within the target area to generate a depth map of the object.

In a disclosed embodiment, the pattern includes multiple spots extending across the first field of view. Additionally or alternatively, the projection axis is angled toward to the camera axis so as to increase an overlap between the first and second fields of view. Further additionally or alternatively, the method includes operating the projector to project the pattern onto a third plane at a third distance from the camera, different from the first and second distances, and using the camera, capturing a third reference image containing a third part of the pattern on the third plane, wherein combining the first and second images includes combining the first, second and third reference images to produce the extended reference image.

In some embodiments, the first and second parts of the pattern both include a central part of the pattern, which appears in both the first and second reference images, and the second reference image includes a peripheral part of the pattern, which is disjoint from and adjoins the central part of the pattern. In some of these embodiments, combining the first and second reference images includes computing a transformation over the central part of the pattern, to match the second reference image to the first reference image, applying the computed transformation to the peripheral part of the pattern in the second reference image to generate a transformed reference image, and appending the transformed reference image to the first reference image to produce the extended reference image.

In some embodiments, computing the transformation includes calculating a warping function over the central part of the pattern in the second reference image, and applying the computed transformation includes extrapolating the warping function over the peripheral part of the pattern. In a disclosed embodiment, calculating the warping function includes compensating for a distortion of the pattern in the first and second reference images.

Additionally or alternatively, computing the transformation includes finding local disparities between the first and second reference images over the central part of the pattern, and calculating the transformation so as to compensate for the local disparities.

There is also provided, in accordance with an embodiment of the invention, a depth mapping device, including a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis. A processor, which is configured to operate the projector to project the pattern onto a first plane at a first distance from the camera, to capture, using the camera, a first reference image containing a first part of the pattern on the first plane, to operate the projector to project the pattern onto a second plane at a second distance from the camera, different from the first distance, to capture, using the camera, a second reference image containing a second part of the pattern on the second plane, to combine the first and second reference images to produce an extended reference image including both the first and second parts of the pattern, and to apply the extended reference image in processing a further image captured by the camera of an object within the target area to generate a depth map of the object.

There is additionally provided, in accordance with an embodiment of the invention, a computer software product for use with a depth mapping device including a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis. The product includes a tangible, non-transitory computer-readable medium in which program instructions are stored, which instructions, when read by a processor, cause the processor to operate the projector to project the pattern onto a first plane at a first distance from the camera, to capture, using the camera, a first reference image containing a first part of the pattern on the first plane, to operate the projector to project the pattern onto a second plane at a second distance from the camera, different from the first distance, to capture, using the camera, a second reference image containing a second part of the pattern on the second plane, to combine the first and second reference images to produce an extended reference image including both the first and second parts of the pattern, and to apply the extended reference image in processing a further image captured by the camera of an object within the target area to generate a depth map of the object.

The present invention will be more fully understood from the following detailed description of the embodiments thereof, taken together with the drawings in which:

DETAILED DESCRIPTION OF EMBODIMENTS

Overview

Figure 1:
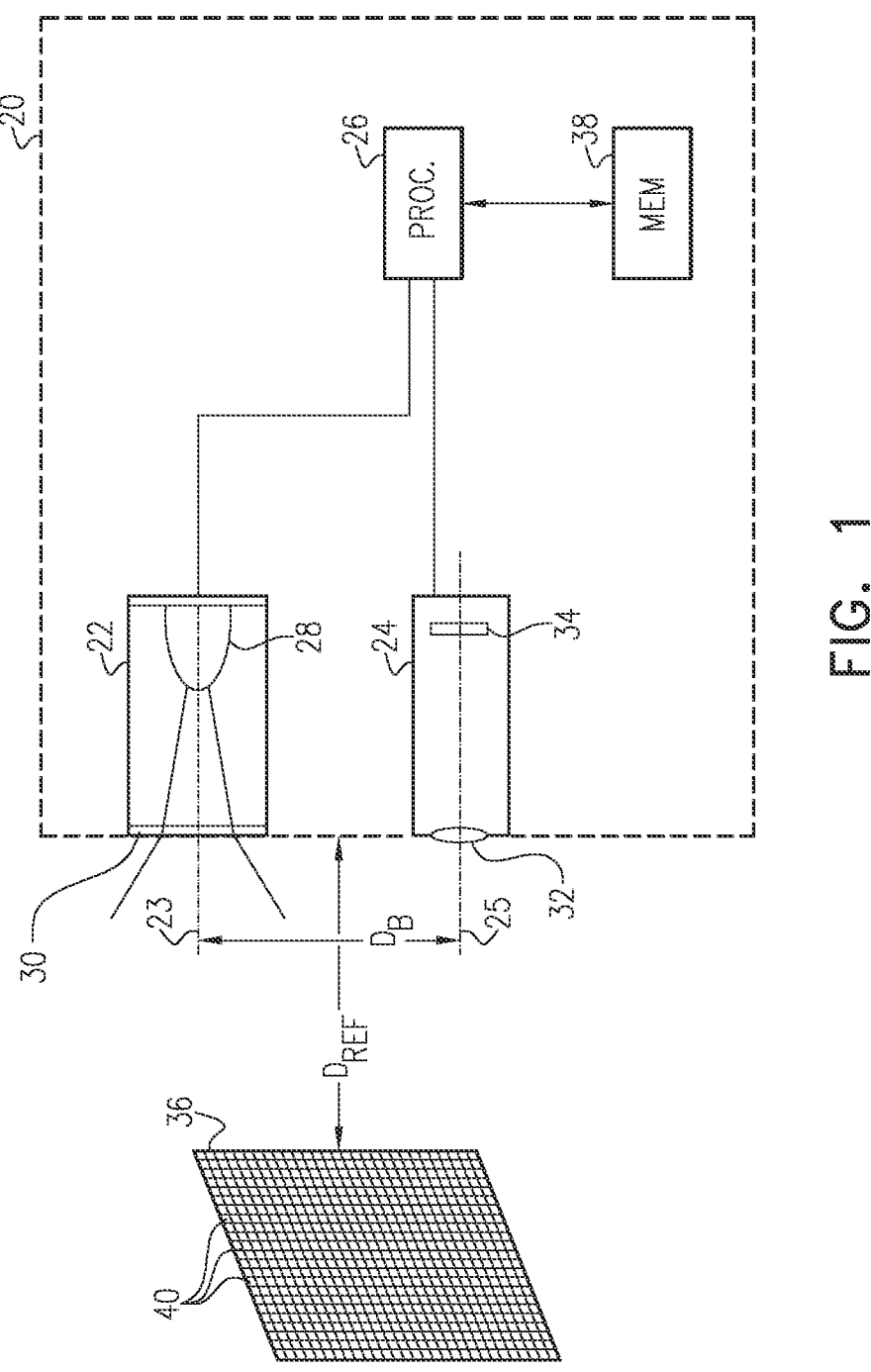
FIG. 1 is block diagram that schematically illustrates a depth mapping device, in accordance with an embodiment of the invention.

As noted earlier, devices for depth mapping based on structured light typically comprise a projector, which projects a pattern of optical radiation, such as a pattern of spots, along a projection axis onto a target area. A camera captures images of the target area about a camera axis, which is offset transversely relative to the projection axis. A processor compares the pattern appearing in images that are captured by the camera to a reference image of the pattern in order to generate depth maps of objects in the images. The known transverse offset between the projection axis and the camera axis enables the processor to convert the local disparities between the image pattern and the reference pattern into depth coordinates.

In some devices, to ensure good coverage of the field of view of the camera, the projector projects the pattern over a field of view about the projection axis that is wider than the field of view of the camera about the camera axis. Similarly, to increase the overlap between these fields of view, the projection axis may be angled toward the camera axis, rather than parallel to it. In these circumstances, different parts of the overall pattern may fall within the field of view of the camera at different distances from the camera, particularly in the peripheral areas of the field of view of the camera. Consequently, peripheral parts of the pattern may be absent from a reference image that is captured at a certain fixed distance from the camera. When a reference image of this sort is used as the reference pattern, the processor may be unable to compute the depths of objects at certain distances in the peripheral areas of the field of view of the camera.

Embodiments of the present invention that are described herein address this problem by creating an extended reference image, which is wider than the field of view of the camera. The extended reference image is created by expanding a basic reference image to include peripheral parts of the pattern. The processor in the depth mapping device applies this extended reference image in processing images captured by the camera to generate depth maps of objects over a wider field of view than would otherwise be achievable.

In some embodiments, in order to generate the extended reference image, a processor operates the projector to project the pattern onto a first plane at a first distance from the camera, and uses the camera to capture a first reference image containing a first part of the pattern on this first plane. The processor then operates the projector to project the pattern onto a second plane at a second distance from the camera, different from the first distance, and uses the camera to capture a second reference image containing a second part of the pattern on the second plane. The processor combines the first and second reference images to produce the extended reference image, which includes both the first and second parts of the pattern. To extend the reference image even further, the processor may control the device to capture one or more additional reference images at other distances from the camera and may incorporate these additional reference images into the extended reference image, as well.

Typically, the first and second parts of the pattern, which appear respectively in the first and second reference images, both comprise a central part of the pattern, while the second reference image also comprises a peripheral part of the pattern, which is disjoint from and adjoins the central part of the pattern. (The first reference image may comprise another peripheral part, which is absent from the second reference image.) To create the extended reference image, the processor computes a transformation over the central part of the pattern, so as to match the second reference image to the first reference image. The transformation is useful in counteracting the effects of optical distortion, which typically differ as a function of distance and angle. The processor then applies this transformation to the peripheral part of the pattern in the second reference image to generate a transformed reference image. The processor appends the peripheral part of this transformed reference image to the first reference image to produce the extended reference image. Methods for computing the transformation and extrapolating it reliably to the peripheral part of the pattern are described further hereinbelow.

In alternative embodiments, other techniques may be used in generating the extended reference image. For example, the processor may extract projection parameters from a single reference image and use these parameters in predicting the appearance of the pattern in the peripheral areas outside the capture reference image. As another example, the processor may take the peripheral areas from a simulated version of the projected pattern and stitch them to the captured reference image. Yet another possibility is to use an additional camera, external to the depth mapping device, to capture an additional image of the projected pattern with a wider field of view than the reference image captured by the camera in the depth mapping device. The processor may then stitch the peripheral parts of this additional image to the reference image to create the extended reference image.

System Description

Figure 2:
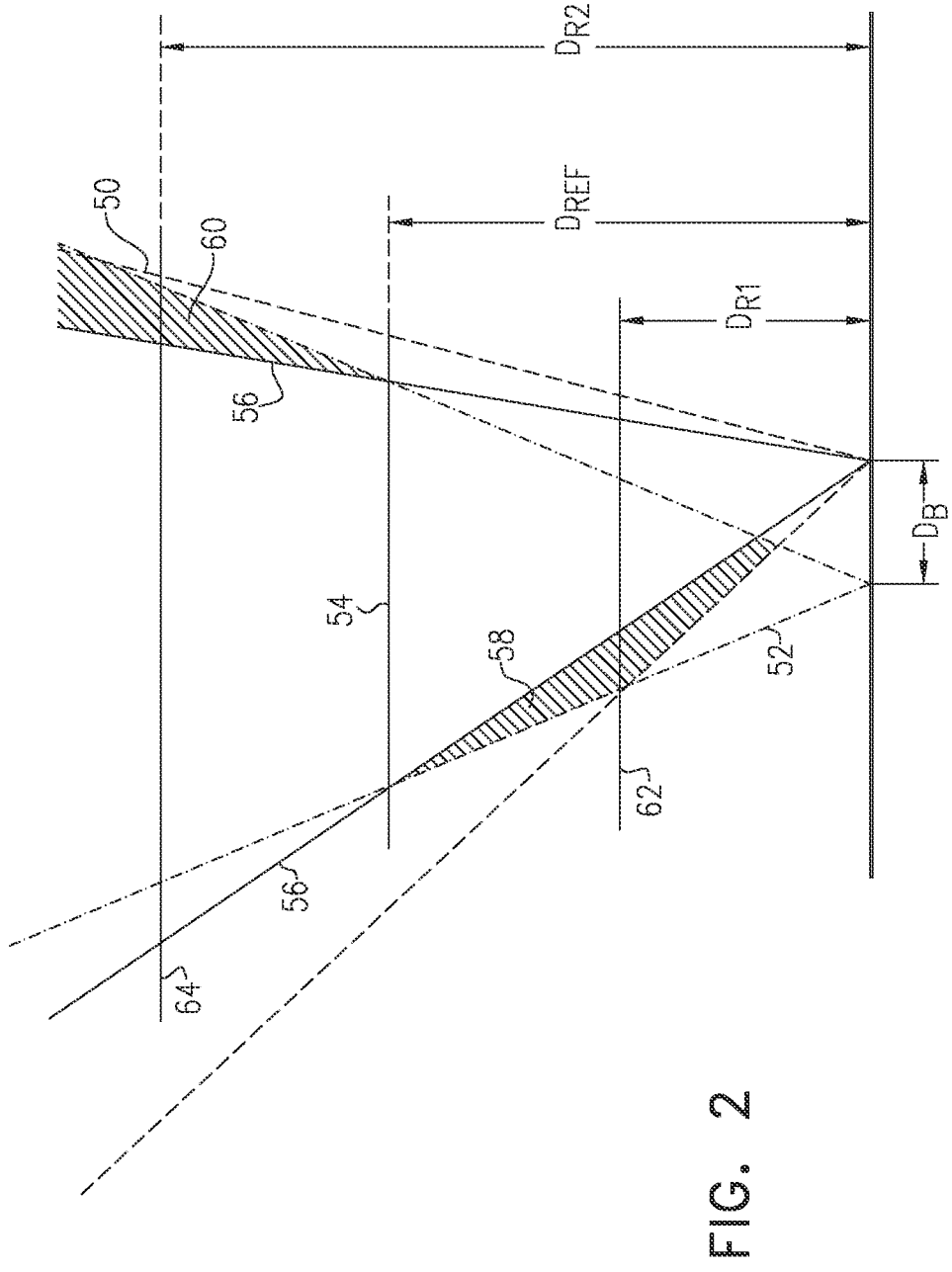
FIG. 2 is a schematic geometrical representation of the field of view of a depth mapping device, showing locations of reference images captured by the device in accordance with an embodiment of the invention.

FIG. 1 is block diagram that schematically illustrates a depth mapping device 20, in accordance with an embodiment of the invention. Device 20 comprises a projector 22, which projects a pattern of optical radiation onto a target area over a first field of view about a projection axis 23. A camera 24 captures images of the target area within a second field of view, narrower than the first field of view, about a camera axis 25, which is offset transversely relative to projection axis 23 by a baseline offset D B. The fields of view of projector 22 and camera 24 are illustrated in FIG. 2. Although axes 23 and 25 are shown in FIG. 1 as being parallel, projection axis 23 may alternatively be angled toward to camera axis 25 so as to increase the overlap between the first and second fields of view, as illustrated in FIG. 2.

Projector 22 comprises a light source 28, such as a laser diode or an array of laser diodes, and a patterning element 30, such as a diffractive optical element (DOE). Such a DOE, for example, may split each laser beam into multiple diffraction orders, thereby projecting a pattern of multiple spots extending across the field of view of projector 22.

Camera 24 comprises objective optics 32, which image the target area onto an image sensor 34, such as a CMOS image sensor.

A processor 26 compares the images captured by camera 24 to an extended reference image 36 of the pattern projected by projector 22 onto a plane at a known distance $D_{REF}$ from camera 24. The extended reference image is captured as part of a calibration procedure, which is described further hereinbelow, and is stored in a memory 38, such as a flash memory, for example. Processor 26 matches the local patterns in the captured image to those in extended reference image 36 and thus finds the disparity, i.e., the transverse displacement of the local pattern relative to the reference image for each pixel 40, or group of pixels, within the extended reference image. Based on these disparities and on the known distance D B between axes 23 and 25, processor 26 computes a depth coordinate for each pixel 40.

Processor 26 typically comprises a general-purpose microprocessor or microcontroller, which is programmed in software to carry out the functions that are described herein. Additionally or alternatively, processor 26 may comprise a special-purpose programmable processing device, such as a digital signal processor (DSP) or a parallel processing array, such as a graphics processing unit (GPU). The software is typically stored in tangible, non-transitory computer-readable media, such as optical, magnetic, or electronic memory media. Further additionally or alternatively, at least some of the functions of processor 26 may be carried out by hard-wired or programmable digital logic circuits.

FIG. 2 is a schematic geometrical representation of respective fields of view 50 and 52 of projector 22 and camera 24 of depth mapping device 20, in accordance with an embodiment of the invention. This figure shows the locations of reference images captured by device 20, including a base reference image 54 at the reference distance $D_{REF}$ and two additional reference images 62 and 64 at a shorter distance $D_{R1}$ and a longer distance $D_{R2}$, respectively.

Base reference image 54 contains an area of the pattern projected by projector 22 that is contained between rays 56. This area is narrower than the full field of view 50 of projector 22. If the reference image used by processor 26 were derived solely from base reference image 54, the processor would be unable to compute depth coordinates of objects outside the bounds of rays 56, including objects in a short-range peripheral area 58 and objects in a long-range peripheral area 60. To enable depth mapping in these areas, camera 24 captures additional reference image 62, which contains the part of the projected pattern appearing in area

58, and additional reference image 64, which contains the part of the projected pattern appearing in area 60.

Thus, all of reference images 54, 62 and 64 contain a central part of the pattern projected by projector 22, while additional reference images 62 and 64 comprise peripheral parts of the pattern, which are disjoint from and adjoin the central part of the pattern. To combine these reference images, processor 26 computes respective transformations over the central part of the pattern, to match the central part of additional reference images 62 and 64 to base reference image 54. Processor 26 applies these transformations to the peripheral parts of the pattern in reference images 62 and 64 to generate transformed reference images. These transformed reference images are appended to base reference image 54, for example by stitching the peripheral parts of the transformed reference images to the base reference image, to produce the extended reference image, which can then be used in depth mapping of objects within field of view 52.

Generation of Extended Reference Image

Figure 3:
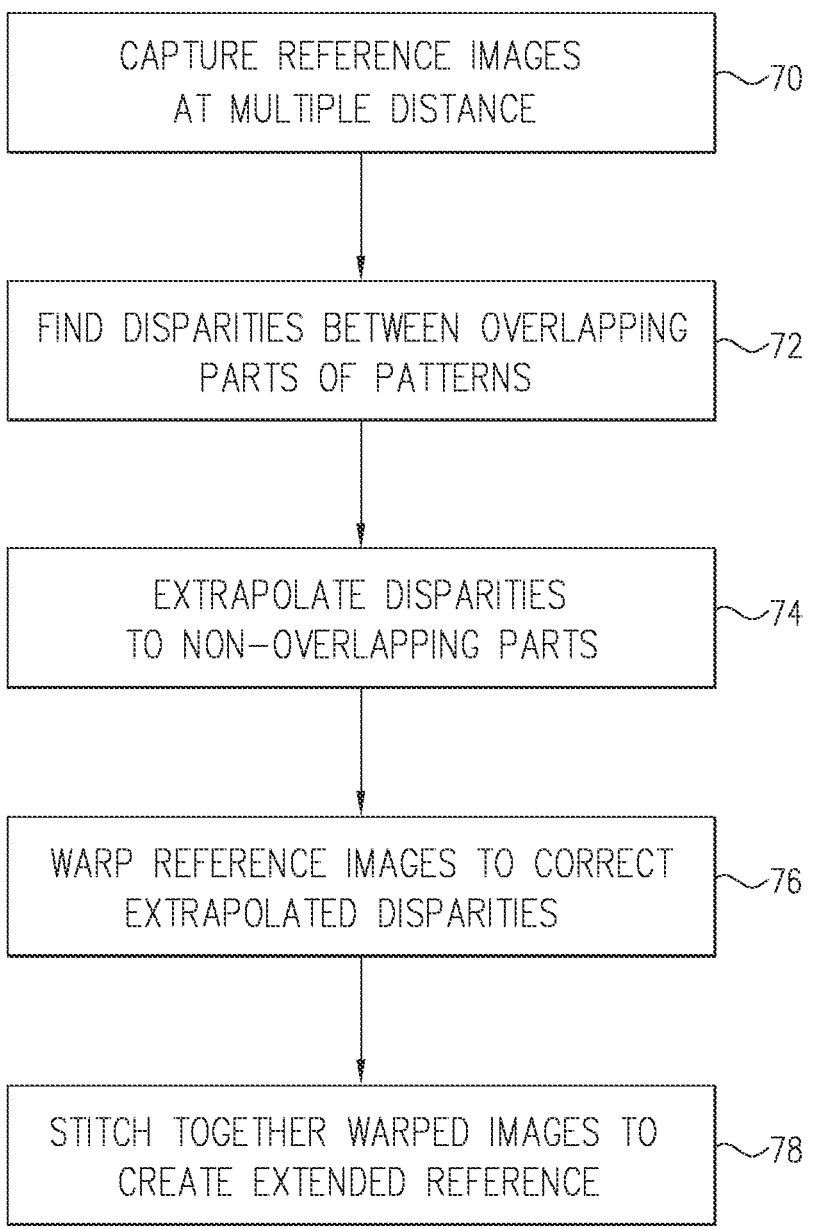
FIG. 3 is a flow chart that schematically illustrates a method for creating an extended reference image for depth mapping, in accordance with an embodiment of the invention.

FIG. 3 is a flow chart that schematically illustrates a method for creating an extended reference image for depth mapping, in accordance with an embodiment of the invention. The method is described, for the sake of convenience and clarity, with reference to the elements of device 20, as shown in FIG. 1, and the geometrical frame of reference shown in FIG. 2. Alternatively, the principles of this method may be applied, mutatis mutandis, in other sorts of pattern-based depth mapping systems. Furthermore, although it is assumed in the description below that the method is carried out by processor 26 in device 20, the computational parts of the method may alternatively be carried out by another processor (not shown) external to device 20.

To begin the process, depth mapping device 20 captures multiple reference images at different distances, at a reference capture step 70. For example, reference images 54, 62 and 64 may be captured by projecting a spot pattern onto test surfaces, using projector 22, at distances $D_{REF}$, $D_{R1}$, and $D_{R2}$, and capturing an image at each location using camera 24.

Processor 26 compares each of images 62 and 64 to reference image 54 to find local disparities between the images in the central part of the pattern, at a disparity measurement step 72. (The central part is the area of the pattern in which images 62 and 64 overlap with image 54.) As explained earlier, the disparity at any given pixel 40 (FIG. 1) is the transverse displacement (in horizontal and vertical coordinates) between the element of the pattern, such as a spot, appearing at that location in reference image 54 and the same pattern element in image 62 or 64. This sort of disparity measurement is typically applied, as well, in the depth mapping algorithm used by processor 26. It may be implemented, for example, using a correlation engine, which matches each pattern element in a captured image to the corresponding pattern element in the reference image by computing local cross-correlation functions.

Processor 26 extrapolates the disparities measured in the central part of the pattern into the non-overlapping, peripheral parts of reference images 62 and 64, at an extrapolation step 74. Although the variation of the disparity in these peripheral areas is hard to predict from first principles, it can reasonably be assumed to vary smoothly over the entire areas of images 62 and 64. Thus, for purposes of extrapolation, a parametrized polynomial function is fitted to the map disparity as a function of location over the central part of the reference images, and this same polynomial function is applied in estimating the disparity in the peripheral areas.

Processor 26 computes image transformations in the form of warping functions, to compensate for the local disparities between reference image 54 and each of images 62 and 64, at a warping step 76. The warping functions shift the pixels in images 62 and 64 locally by displacements that are equal and inverse to the value of the disparity polynomial function computed at step 74 for each pixel. Processor 26 applies the warping functions to images 62 and 64 specifically over the peripheral parts of the images, where the disparities (and hence the warping functions themselves) have been extrapolated from the central parts of the images. The warping functions compensate for the local disparities between reference images and thus compensate for the distortion of the pattern in images 62 and 64 relative to image 54.

After warping images 62 and 64, processor 26 stitches the peripheral parts of the warped images to base reference image, thus creating the extended reference image, at a stitching step 76.

Figure 4:
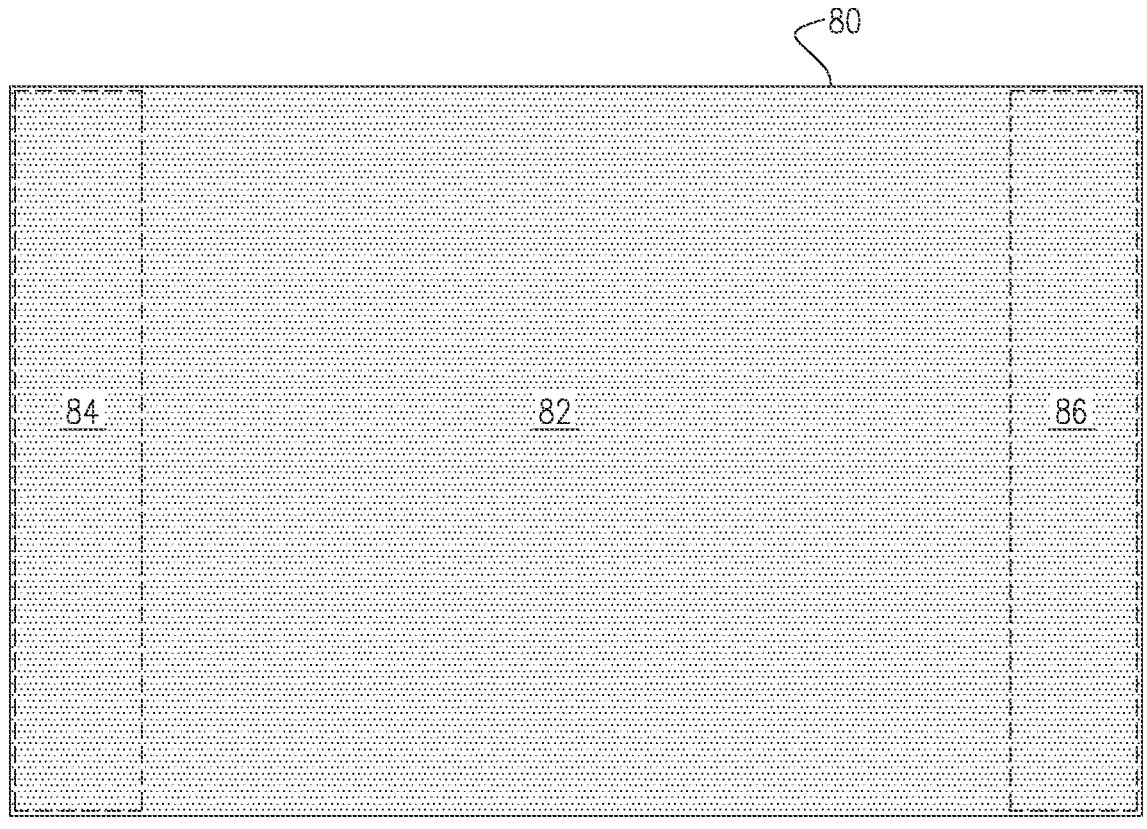
FIG. 4 is a schematic frontal view of an extended reference image, in accordance with an embodiment of the invention.

FIG. 4 is a schematic frontal view of an extended reference image 80, in accordance with an embodiment of the invention. A central part 82 of extended reference image 80 is taken from base reference image 54, at distance $D_{REF}$. Peripheral parts 84 and 86 are taken from additional reference images 62 and 64, at distances closer to and farther from camera 24 than $D_{REF}$. As a result of the extrapolated warping transformation, the structured light pattern in peripheral parts 84 and 86 is correctly aligned with the pattern in central part 82. Processor 26 is thus able to map depth accurately over substantially the entire field of view 52 of camera 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:

providing a depth mapping device comprising a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis;

operating the projector to project the pattern onto a first plane at a first distance from the camera, and using the camera, capturing a first reference image containing a first part of the pattern on the first plane;

operating the projector to project the pattern onto a second plane at a second distance from the camera, different from the first distance, and using the camera, capturing a second reference image containing a second part of the pattern on the second plane, wherein the first and second parts of the pattern both comprise a same central part of the pattern, which appears in both the first and second reference images, and wherein the second reference image comprises a peripheral part of the pattern, which is disjoint from and adjoins the central part of the pattern;

combining the first and second reference images to produce an extended reference image comprising both the first and second parts of the pattern; and applying the extended reference image in processing a further image captured by the camera of an object within the target area to generate a depth map of the object.

2. The method according to claim 1, wherein the pattern comprises multiple spots extending across the first field of view.

3. The method according to claim 1, wherein the projection axis is angled toward to the camera axis so as to increase an overlap between the first and second fields of view.

4. The method according to claim 1, and comprising operating the projector to project the pattern onto a third plane at a third distance from the camera, different from the first and second distances, and using the camera, capturing a third reference image containing a third part of the pattern on the third plane, wherein combining the first and second images comprises combining the first, second and third reference images to produce the extended reference image.

5. The method according to claim 1, wherein combining the first and second reference images comprises:

computing a transformation over the central part of the pattern, to match the second reference image to the first reference image;

applying the computed transformation to the peripheral part of the pattern in the second reference image to generate a transformed reference image; and appending the transformed reference image to the first reference image to produce the extended reference image.

6. The method according to claim 5, wherein computing the transformation comprises calculating a warping function over the central part of the pattern in the second reference image, and wherein applying the computed transformation comprises extrapolating the warping function over the peripheral part of the pattern.

7. The method according to claim 6, wherein calculating the warping function comprises compensating for a distortion of the pattern in the first and second reference images.

8. The method according to claim 5, wherein computing the transformation comprises finding local disparities between the first and second reference images over the central part of the pattern, and calculating the transformation so as to compensate for the local disparities.

9. A depth mapping device, comprising:

a projector, which is configured to project a pattern of optical radiation onto a target area over a first field of view about a projection axis;

a camera, which is configured to capture images of the target area within a second field of view, narrower than the first field of view, about a camera axis, which is offset transversely relative to the projection axis; and a processor, which is configured to operate the projector to project the pattern onto a first plane at a first distance from the camera, to capture, using the camera, a first reference image containing a first part of the pattern on the first plane, to operate the projector to project the pattern onto a second plane at a second distance from the camera, different from the first distance, to capture, using the camera, a second reference image containing a second part of the pattern on the second plane, to combine the first and second reference images to produce an extended reference image comprising both the first and second parts of the pattern, and to apply the extended reference image in processing a further image captured by the camera of an object within the target area to generate a depth map of the object, wherein the first and second parts of the pattern both comprise a same central part of the pattern, which appears in both the first and second reference images, and wherein the second reference image comprises a peripheral part of the pattern, which is disjoint from and adjoins the central part of the pattern.

10. The device according to claim 9, wherein the pattern comprises multiple spots extending across the first field of view.

11. The device according to claim 9, wherein the projection axis is angled toward the camera axis so as to increase an overlap between the first and second fields of view.

12. The device according to claim 9, wherein the projector is configured to project the pattern onto a third plane at a third distance from the camera, different from the first and second distances, whereby the camera captures a third reference image containing a third part of the pattern on the third plane, and wherein the processor is configured to combine the first, second and third reference images to produce the extended reference image.

13. The device according to claim 9, wherein the processor is configured to compute a transformation over the central part of the pattern, to match the second reference image to the first reference image, to apply the computed transformation to the peripheral part of the pattern in the second reference image to generate a transformed reference image, and to append the transformed reference image to the first reference image to produce the extended reference image.

14. The device according to claim 13, wherein the transformation comprises a warping function calculated by the processor over the central part of the pattern in the second reference image, and wherein the processor is configured to extrapolate the warping function over the peripheral part of the pattern.

15. The device according to claim 14, wherein the warping function compensates for a distortion of the pattern in the first and second reference images.

16. The device according to claim 13, wherein the processor is configured to find local disparities between the first and second reference images over the central part of the pattern, and to calculate the transformation so as to compensate for the local disparities.

17. A computer software product for use with a depth mapping device including a projector, which is configured to project a pattern of optical radiation onto a target area over a first field of view about a projection axis, and a camera, which is configured to capture images of the target area within a second field of view, narrower than the first field of view, about a camera axis, which is offset transversely relative to the projection axis, the product comprising a tangible, non-transitory computer-readable medium in which program instructions are stored, which instructions, when read by a processor, cause the processor to operate the projector to project the pattern onto a first plane at a first distance from the camera, to capture, using the camera, a first reference image containing a first part of the pattern on the first plane, to operate the projector to project the pattern onto a second plane at a second distance from the camera, different from the first distance, to capture, using the camera, a second reference image containing a second part of the pattern on the second plane, to combine the first and second reference images to produce an extended reference image comprising both the first and second parts of the pattern, and to apply the extended reference image in processing a further image captured by the camera of an object within the target area to generate a depth map of the object, wherein the first and second parts of the pattern both comprise a same central part of the pattern, which appears in both the first and second reference images, and wherein the second reference image comprises a peripheral part of the pattern, which is disjoint from and adjoins the central part of the pattern.

18. The product according to claim 17, wherein the instructions cause the processor to compute a transformation over the central part of the pattern, to match the second reference image to the first reference image, to apply the computed transformation to the peripheral part of the pattern in the second reference image to generate a transformed reference image, and to append the transformed reference image to the first reference image to produce the extended reference image.

* * * * *